UNITED STATES PATENT OFFICE.

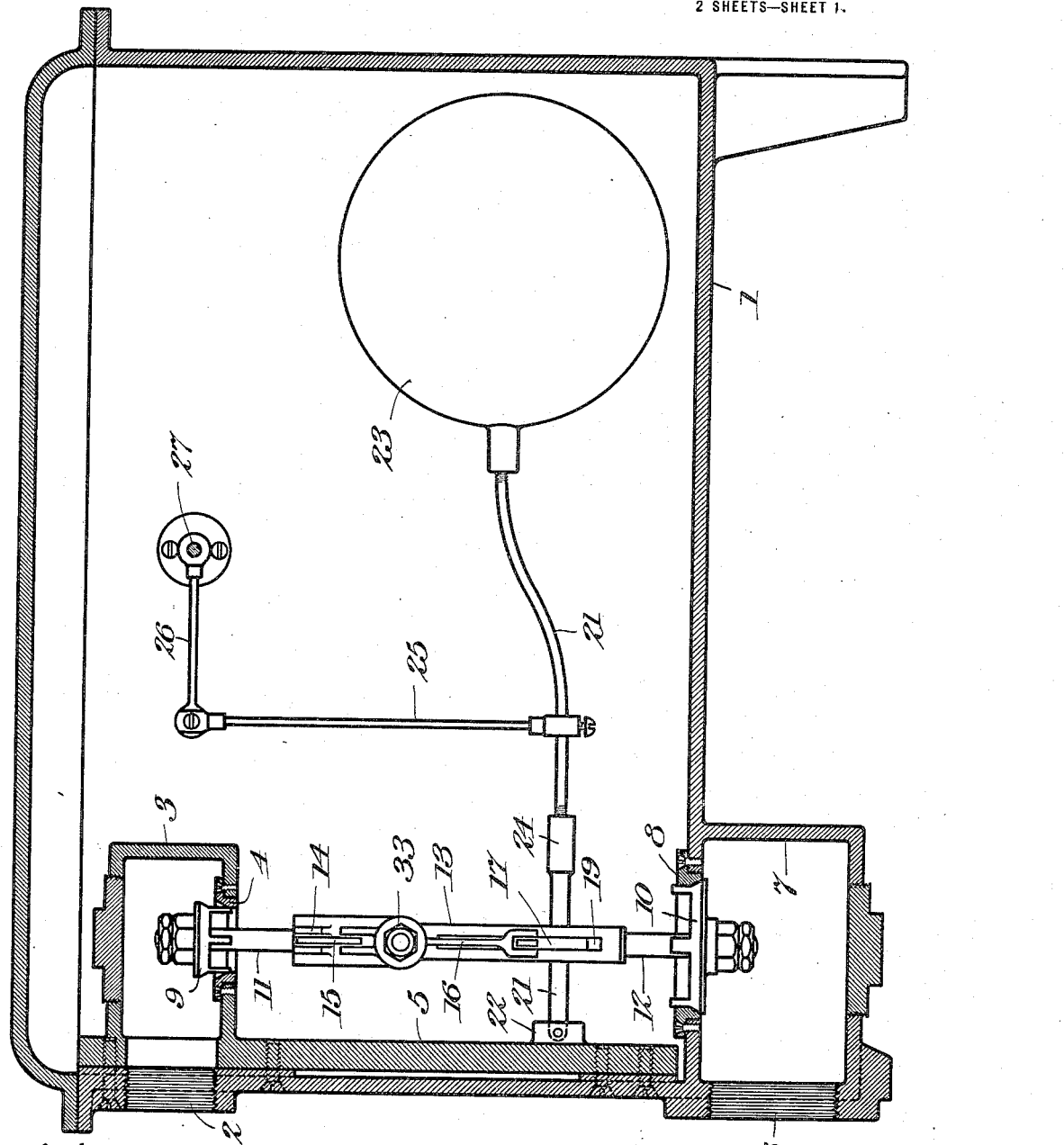

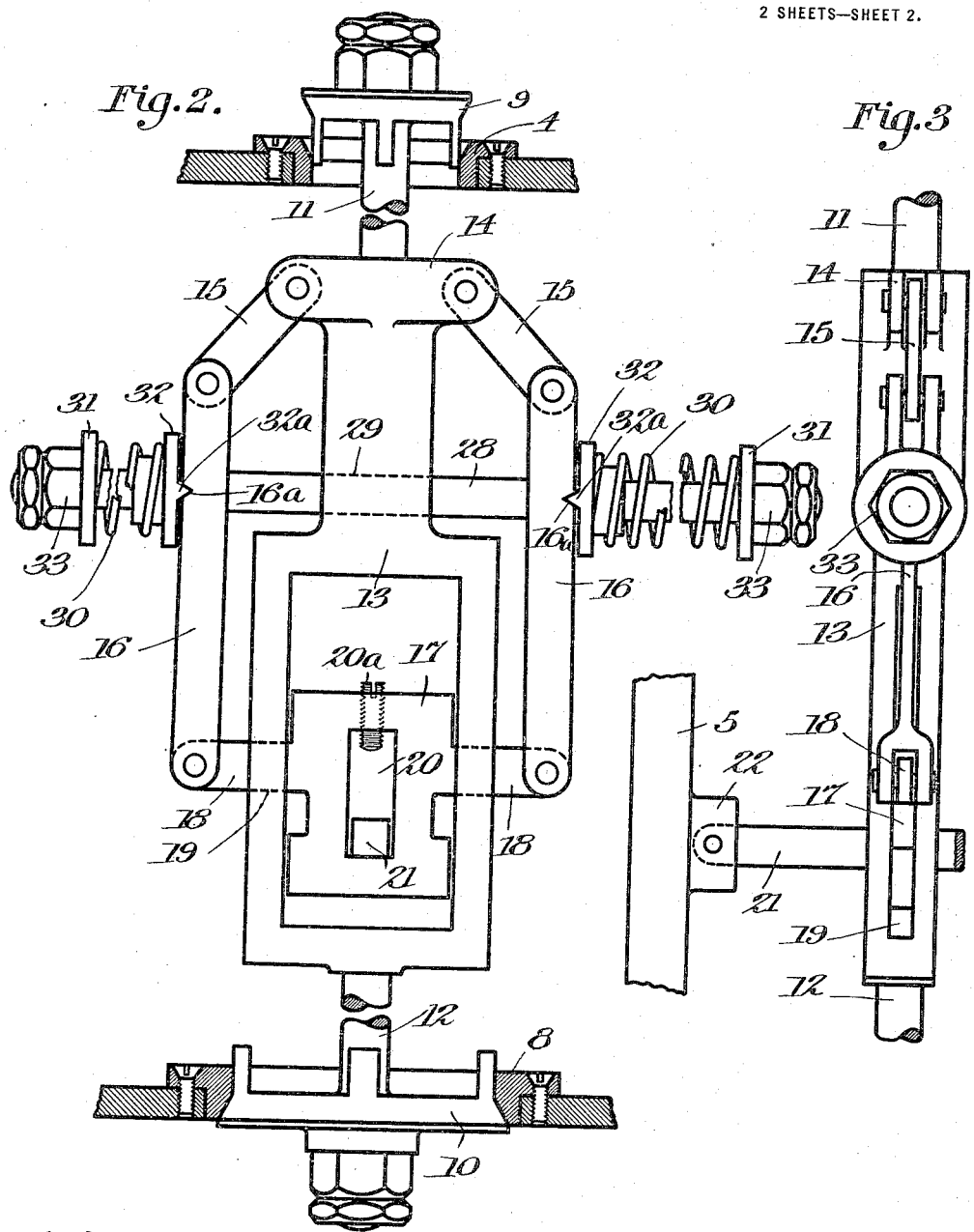

ROBERT HALL, OF LOCKPORT, NEW YORK, ASSIGNOR TO AMERICAN DISTRICT STEAM COMPANY, OF NORTH TONAWANDA, NEW YORK, A CORPORATION OF NEW YORK.

LIQUID-MEASURING DEVICE.

1,152,891.     Specification of Letters Patent.     Patented Sept. 7, 1915.

Application filed March 2, 1914. Serial No. 822,022.

*To all whom it may concern:*

Be it known that I, ROBERT HALL, a citizen of the United States, residing at Lockport, in the county of Niagara and State of New York, have invented certain new and useful Improvements in Liquid-Measuring Devices, of which the following is a specification, reference being had therein to the accompanying drawing.

This invention relates to meters for measuring liquids.

The object of the invention is to provide an automatically-operated liquid-measuring device of simple construction and capable of the highest degree of efficiency and accuracy, and by which the number of fillings thereof—it being of predetermined capacity—is registered in any appropriate and preferred way. In this manner, the exact quantity of liquid which passes through the meter may be accurately and minutely measured and correctly recorded.

A further object of the invention is to provide, in such a device, mechanism of comparatively few components but all of which readily coöperate to produce the desired results.

My invention is particularly well adapted for use in connection with the measuring of the water of condensation resulting from steam produced at a central plant and supplied to the consumer at predetermined temperature. For such purpose, it is essential that the measurement shall be accurate not only to satisfy the consumer but, also, in order that such steam may yield a profit to the producer at the central plant. It is to be understood, however, that use of my improved meter is not restricted to this particular purpose, since it may be utilized in any instance where it is desired to measure liquid flowing from one point to another.

With these and other objects in view, the invention resides broadly in the novel features, in the construction and aggroupment of components, and in certain details, all as hereinafter described and generically and specifically set forth in the appended claims.

In the accompanying drawings, forming a part hereof, I have exemplified an embodiment of my invention, it being understood that this particular embodiment is merely illustrative and that the same may be considerably modified to exhibit other possible embodiments falling within the spirit of the invention and the underlying principles thereof.

In these drawings: Figure 1 is a view in vertical section of a casing and its contained meter-mechanism, and constructed in accordance with my invention; Fig. 2 is a fragmentary view, in elevation, of a part of the mechanism; and Fig. 3 is a similar view, in end elevation, of the same.

In these drawings, the reference-numeral 1 designates a casing, which may be of any required form and dimensions to provide an interior of predetermined capacity. The casing is provided, adjacent its upper portion, with an inlet 2 feeding into a valve-housing 3 provided with a valve-seat 4. The housing is formed as a part of a supporting-plate 5 secured to the side of the casing. The casing also has adjacent its lower portion, an outlet 6 opening out of a valve-housing 7 provided with a valve-seat 8. Operating to control the flow of liquid into the casing is an inlet-valve 9 adapted to be moved in relation to its seat 4 by mechanism (presently to be described) and in proper synchronism with an outlet-valve 10 which controls the outflow of liquid from the casing. The aforementioned mechanism—interposed between the inlet and outlet-valves—includes a valve-rod 11 attached to the inlet-valve and a valve-rod 12 attached to the outlet-valve. These rods are rigidly connected to a yoke-member 13 at opposite ends thereof. The upper portion of the yoke-member carries a head 14 and to the opposite ends of this are pivotally connected short tripping links 15—there being one at each side of the head—which in turn pivotally connect with the bifurcated upper ends of elongated actuating links 16, these latter being disposed at opposite sides of the yoke-member and in vertical parallelism therewith. Pivotally attached to the lower bifurcated ends of the elongated links 16 is an oscillating frame-element 17, the extended arms 18 of which have a vertical movement in elongated guide-slots 19 in the yoke-member 13. The frame-element 17 is provided with a vertical opening 20 of predetermined size; and in this a horizontal float-rod 21 is adapted to have limited movement, and which movement may be varied by means of an adjusting-screw 20ª threaded through the upper section of the frame-element.

The float-rod is fulcrumed at one end on a boss 22 outstanding from the aforementioned supporting-plate 5. At its opposite end, the rod carries a float 23 of predetermined dimension and occupying a position in predetermined relation to its fulcrum and to said frame-element which, as shown, occupies a position intermediate the ends of said float-rod. To permit a lengthening or shortening of said rod, whereby the relative position of the float may be changed, said rod is provided with a turn-buckle 24. Adjustably connected to said horizontal float-rod is a vertically-disposed rod 25, to the upper end of which is secured a short horizontal arm 26 fast on a shaft 27 suitably journaled and adapted to actuate the components of a register, not shown.

To effect certain operations of the elongated links 16 and the parts actuated thereby, I elect to provide yieldable components. That is to say, a cross-rod 28, which extends between the bifurcations of the elongated links 16 and through a hole 29 in the yoke-member, is encircled, adjacent its opposite ends, by springs which in this instance are in the form of compression-springs 30, each of these bearing, respectively, against washers 31 and 32, the former abutting against a nut 33, and the latter being provided with a sharp-edged projection 32ª extending into a correspondingly-formed incut 16ª in the link 16.

Operation: The operation of the foregoing structure, briefly explained, is as follows: Assuming, for instance, that the casing 1 is empty; the float 23 and float-rod 21 take a position toward the bottom of the casing. The float-rod will, in consequence, depress the frame-element 17 and, thus, the links 16 operate to cause the inlet-valve to be held open; that is to say, when the parts are moved into this position, the springs 30 force the upper ends of the links 15 toward the center, and this results in a rapid raising of the yoke-member 13. Thereby the valve-rods 11 and 12 are actuated to unseat the valve 9 and to seat and close the outlet-valve 10. The valve-mechanism will now have been locked at the limit of its upward movement. The fluid, to be measured, enters the casing through the inlet-opening 2 and valve 9. As the casing fills with the fluid, the float 23 will rise and raise the float-rod 21 which then engages the upper adjustment of the frame-element 17. This element, with its arms 18, together with the links 16, will then be gradually elevated. As the links 16 are raised and their upper ends move upwardly and actuate the links 15, said links 16 will be thrust outwardly with the result that the springs 30 will be considerably compressed. The motion of these components continues until the links 15 assume a position just above the horizontal. At that instant, the power of the compressed springs is at once applied to move the links 16 in the opposite direction, whereupon the yoke-member 13, the valve-rods 11 and 12, and their respective valves, are rapidly forced downward until the inlet-valve 9 seats itself. The outlet valve 10 will then be opened, and the fluid drains from the casing through the opening 6 until the float again assumes its lowermost position, whereupon a reversal of operation of the parts occurs, as already described.

It is to be understood that the valve 10 remains seated during the upward movement of the yoke, and as a result of this relation, the upward movement of the links 16 is rendered possible. Obviously, the reverse operation takes place when the valve 9 is seated and the float descends.

By means of the adjusting screw 20ª, the amplitude of the float-rod may be varied and, thereby, that of the other parts correspondingly changed.

From the foregoing, it will be seen that I have devised a simple but effective device for trapping a fluid until a predetermined quantity of it has accumulated in the casing whereupon, by the fluid-operated float assuming its highest position, the fluid is released. The movement of the parts connected with and controlled by the float effects movement of the rod 25, arm 26 and shaft 27 and, thus, operates a suitable register or recording mechanism. The components of the meter are so disposed and operated that liability of derangement or binding thereof is reduced to a minimum, hence the meter has such a certainty of operation and produces a corresponding accuracy of results that it is well adapted for the purposes already hereinabove set forth. Moreover, it is fully operative without the aid of any outside power, such (for instance) as a water-pressure from an outside source that is resorted to in some known forms of meters to operate them.

As many changes can be made in the above construction, and many widely different embodiments of this invention may obviously be exhibited without departing from the spirit thereof, it is intended that all matter contained in the foregoing description and shown in the accompanying drawings shall be interpreted as illustrative and not in any limiting sense. It is also to be understood that the language used in the following claims is intended to cover all of the generic and specific features of the invention which, as a matter of language, might be said to fall therebetween.

What I claim is:

1. A liquid measuring device including in combination, a casing provided with an inlet and an outlet, valves for controlling said inlet and outlet, and mechanism for operating said valves in synchronism comprising a yoke-member, an oscillating frame-element encompassed by and operating between the walls of said yoke-member, connections between said yoke-member and frame-element, and a float-carrying rod operating to actuate said frame-element.

2. A liquid measuring device including in combination, a casing provided with an inlet and an outlet, valves for controlling said inlet and outlet, mechanism for operating said valves in synchronism comprising a yoke-member, an oscillating frame-element encompassed by and operating between the walls of said yoke-member, connections between said yoke-member and frame-element, a float-carrying rod operating to actuate said frame-element, and means acting on said connections to actuate said yoke-member.

3. A liquid measuring device including in combination, a casing provided with an inlet and an outlet, valves for controlling said inlet and outlet, mechanism for operating said valves in synchronism comprising a yoke-member, an oscillating frame-element encompassed by and operating between the walls of said yoke-member, connections between said yoke-member and frame-element, a float-carrying rod operating to actuate said frame-element, and resilient means acting on said connections to actuate said yoke-member.

4. A liquid measuring device including in combination, a casing provided with an inlet and an outlet both at the same side of said casing, valves for controlling said inlet and outlet, and mechanism for operating said valves in synchronism comprising a yoke-member, an oscillating frame-element encompassed by and operating between the walls of said yoke-member, connections between said yoke-member and frame-element, a float-carrying rod operating to actuate said frame-element, and resilient means acting on said connections to actuate said yoke-member.

5. A liquid measuring device including in combination, a casing provided with an inlet and an outlet, valves for controlling said inlet and outlet, mechanism for operating said valves in synchronism comprising a yoke-member, an oscillating frame-element encompassed by and operating between the walls of said yoke-member, connections between said yoke-member and frame-element, a float-carrying rod operating to actuate said frame-element, and resilient means acting on said connections to actuate said yoke-member, said rod being fulcrumed at its end on the casing and at one side of its connection with the frame-element.

6. A liquid measuring device including a casing provided with an inlet and an outlet, housings disposed adjacent to said inlet and outlet, valve-seats in said housings, valves adapted to be alternately positioned in and away from their respective seats, and mechanism for actuating said valves comprising a yoke-member, a frame-element slidably mounted in operative relation to said yoke-member, actuating links connected to said frame-element, tripping-links connecting said actuating-links with said yoke-member, and means for actuating said links sidewise whereby said yoke-member is shifted in the direction of the axis of the valves.

7. A liquid measuring device including a casing provided with an inlet and an outlet, housings disposed adjacent to said inlet and outlet, valve-seats in said housings, valves adapted to be alternately positioned in and away from their respective seats, mechanism for actuating said valves comprising a yoke-member, a frame-element slidably mounted in operative relation to said yoke-member, actuating links connected to said frame-element, tripping-links connecting said actuating-links with said yoke-member, means for actuating said links sidewise whereby said yoke-member is shifted in the direction of the axis of the valves, and a liquid-operated float for actuating said frame-element and yoke-member in the opposite direction.

8. A liquid measuring device including a casing provided with an inlet and an outlet, housings disposed adjacent to said inlet and outlet, valve-seats in said housings, valves adapted to be alternately positioned in and away from their respective seats, mechanism for actuating said valves comprising a yoke-member, a frame-element slidably mounted in operative relation to said yoke-member, actuating links connected to said frame-element, tripping-links connecting said actuating-links with said yoke-member, means including compression-springs acting on said actuating-links for actuating said links sidewise whereby said yoke-member is shifted in the direction of the axis of the valves, and a liquid-operated float for actuating said frame-element and yoke-member in the opposite direction.

9. A liquid measuring device including a casing provided with an inlet and an outlet, housings disposed adjacent to said inlet and outlet, valve-seats in said housings, valves adapted to be alternately positioned in and away from their respective seats, mechanism for actuating said valves comprising a yoke-member, a frame-element slidably mounted in operative relation to said yoke-member, actuating links connected to said frame-element, tripping-links connecting said actuating-links with said yoke-member, means including springs acting on said actuating-links for actuating said links sidewise whereby said yoke-member is shifted in the direction of the axis of the valves, a liquid-operated float for actuating said frame-element and yoke-member in the opposite direction, and a float-carrying rod fulcrumed to the casing and engageable with the frame-element intermediate of its ends.

10. A liquid measuring device including a casing provided with an inlet and an outlet, housings disposed adjacent to said inlet and outlet, valve-seats in said housings, valves arranged in approximate relative vertical alinement and adapted to be alternately positioned in and away from their respective seats, mechanism for actuating said valves comprising a yoke-member, a frame-element operatively connected to the yoke-member, actuating-links connected to said frame-element, tripping-links connecting said actuating-links with said yoke-member, means including springs acting on said actuating-links for actuating said links sidewise whereby said yoke-member is shifted in the direction of the axis of the valves, a liquid-operated float for actuating said frame-element and yoke-member in the opposite direction, and a float-carrying member fulcrumed adjacent to and engageable with said frame-element.

11. A liquid measuring device including a casing comprising a single liquid-holding chamber and provided with an inlet and an outlet, housings disposed adjacent to said inlet and outlet, valve-seats in said housings, valves arranged in approximate relative vertical alinement and adapted to be alternately positioned in and away from their respective seats, mechanism for actuating said valves comprising a yoke-member, a frame-element operatively connected to the yoke-member, actuating-links connected to said frame-element, tripping-links connecting said actuating-links with said yoke-member, means including springs acting on said actuating-links for actuating said links sidewise whereby said yoke-member is shifted in the direction of the axis of the valves, a liquid-operating float for actuating said frame-element and yoke-member in the opposite direction, and a float-carrying member fulcrumed adjacent to and operable on said yoke-member for positioning said valves in relation to their valve-seats.

12. A liquid measuring device including a casing comprising a single liquid-holding chamber and provided with an inlet and an outlet, housings disposed adjacent to said inlet and outlet, valve seats in said housings, valves arranged in approximate relative vertical alinement and adapted to be alternately positioned in and away from their respective seats, mechanism for actuating said valves comprising a yoke-member, a frame-element operatively connected to the yoke-member, actuating-links connected to and arranged on opposite sides of said frame-element, tripping-links connecting said actuating-links with said yoke-member, means including springs acting on said actuating-links for actuating said links sidewise whereby said yoke-member is shifted in the direction of the axis of the valves, a liquid-operating float for actuating said frame-element and yoke-member in the opposite direction, and an oscillating float-carrying member engageable alternately with different portions of said frame-element to actuate it and the yoke-member whereby said valves are positioned in relation to their seats.

13. A liquid measuring device including a casing provided with an inlet and an outlet, housings disposed adjacent to said inlet and outlet, valve-seats in said housings, valves adapted to be alternately positioned in relation to their respective seats, and mechanism for actuating said valves comprising a yoke-member, a frame-element slidably mounted in operative relation to said yoke-member, actuating links connected to said frame-element, tripping-links connecting said actuating-links with said yoke-member, means for actuating said links sidewise whereby said yoke-member is shifted in the direction of the axis of the valves, a float-carrying rod connected to and actuatable to operate said frame-element, said link-actuating means including a plurality of compression-springs operating independently on the actuating-links, and means for varying the amplitude of said rod and thereby changing the period of rest of the parts.

In testimony whereof I affix my signature in presence of two witnesses.

ROBERT HALL.

Witnesses:
HOWARD E. LONG,
CHARLES J. DUDLEY.

Copies of this patent may be obtained for five cents each, by addressing the "Commissioner of Patents, Washington, D. C."